Dec. 9, 1941.  E. MOEN  2,265,568
CENTER PIN FOR MILLING MACHINES
Filed Dec. 13, 1940
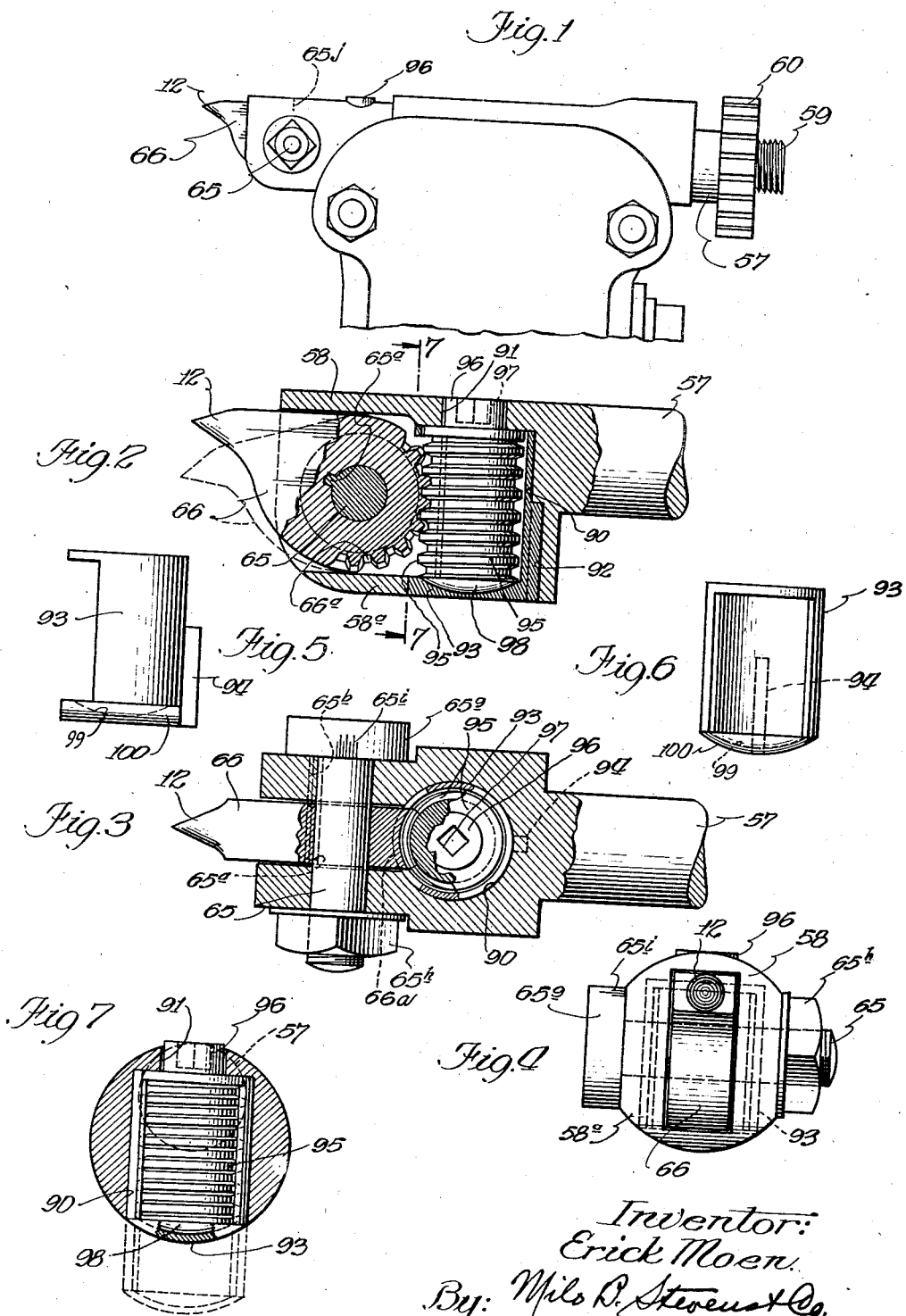
Inventor:
Erick Moen
By: Milo B. Stevens & Co.
Atty's Patented Dec. 9, 1941

2,265,568

UNITED STATES PATENT OFFICE 2,265,568

CENTER PIN FOR MILLING MACHINES

Erick Moen, Chicago, Ill.

Application December 13, 1940, Serial No. 370,057

11 Claims. (Cl. 90—23)

My invention relates to the tail stocks for milling machines, and particularly to the center pin support or bearing, and the present development is an improvement over the center pin installation shown and described in my pending patent application filed April 13, 1940, under Serial No. 329,544.

One object of the present improvement is to localize the control of the center pin support in the frontal zone of the tail stock, whereby to render such control more compact.

A further object of the improvement is to provide a control for the center pin which is sturdily built to withstand the pressure of the work.

Another object of the improvement is to build the center pin installation as a unit which may be quickly removed from the tail stock in case of adjustment, replacement or repair.

An additional object of the improvement is to design the novel center pin installation along lines of efficiency and for handy adjustment.

With the above objects in view and any others which may suggest themselves from the description to follow, a better understanding of the improvement may be had by reference to the accompanying drawing, in which—

Fig. 1 is a partial view of the tail stock, showing the improved center pin installation;

Fig. 2 is an enlarged longitudinal section of the center pin assembly;

Fig. 3 is a plan section, partly in elevation;

Fig. 4 is a front view;

Fig. 5 is a side view of a control bearing;

Fig. 6 is a front view of the bearing; and

Fig. 7 is a section on the line 7—7 of Fig. 2 partly broken away.

Basically, the center pin assembly is installed in the tail stock similarly to the construction in my said patent application. Thus, the shaft 57 of the assembly is slidable forth and back in the tail stock by the effect of the rotatable hand nut 60 on the threaded reduction 59 of the shaft. Frontally, the shaft is developed to form the headpiece 58, as before, except that the tail stock is made with more clearance below the latter in order to accommodate an underslung portion 58a of the headpiece.

The center pin 12 is constituted in the same manner as in the pending case, being, however, rotatable with the bolt 65 by virtue of a key 65a directed from the latter into the stock of the center pin. As shown, the key is preferably positioned in the direction of the center pin point, that is, where the stock of the center pin is thickest, in order to impose less strain on such stock. Thus, when the center pin is rotated for adjustment, the bolt head 65g turns with the same, a nut 65h on the opposite side of the headpiece serving to fix the adjustment. The adjustment may be measured by marking the periphery of the bolt head 65g with a series of graduations 65i which read in relation to an origin line 65j on the corresponding face of the headpiece.

While a block 67 was used in the pending case to station the center pin at the point to which it had been adjusted, the improvement employs other means for this purpose. Thus, the headpiece is bored with a vertical cylindrical cavity 90 from the bottom, such cavity being reduced with a top outlet 91 which is concentric with the bore 90; also the latter has a lateral vertical groove 92 part-way from the bottom.

A cylindrical cup 93 is designed to be driven upwardly into the bore 90 to make a tight fit therein, the cup having a rear key 94 which fits the groove 92 to prevent the cup from turning. Before its insertion into the headpiece 58, the cup receives a vertical worm 95 which fills the cup and has an upward circular stem 96 formed with an angular wrench socket 97.

The top of the worm 95 is leveled off to be substantially flush with the rim of the cup 90. The bottom of the worm, however, is made convex as indicated at 98 in order to make a sliding rotary fit with the similarly formed floor 99 of the cup. The bottom or under side of the cup has a part cylindrical curvature, as indicated at 100, to conform or be flush with the curvature of the headpiece bottom 58a.

When the cup 93 is fitted into the headpiece 58 as mentioned, its stem 96 rises freely into the bore reduction 91, so that a wrench applicable to the socket 97 may rotate the worm 95 in the cup. As in the former case, the body 66 of the center pin 12 is made with a back gear 66a, this gear however being concave in order to fit the threads of the worm 95. After the assembly of the worm and the cup has been installed, the center pin connection with the same is made by first backing the center pin alone into the headpiece 58 until the center pin gear meshes with the worm. Then the bolt 65 is passed through one side of the headpiece, such side having a slot 65b for the passage of the key 65a until the latter becomes lodged in the center pin stock. The threaded end of the bolt now protrudes from the opposite side of the headpiece and is fitted with the securing nut 65h.

It will now be apparent that adjustments of the center pin from the full line to the dotted line position may be made by merely loosening the nut 65h and turning the worm 95 to the required point. This manner of controlling the angle of the center pin is far superior to that employed in my pending application, since it places the adjustment immediately back of the center pin and provides the high leverage and nicety of adjustment afforded by a worm control. Moreover, the adjustment is very handy by the mere application of an Allen wrench to the socket 97. Further, the worm control is a massive or sturdy reinforcement for the center pin at any position of the latter, first because the strain on the center pin point is always downward, causing the worm to bear upwardly on the solid portion of the headpiece, and second because the worm and its socket are in one piece. As generally known, worm adjustments on rotatable parts involve the centering of the worm on a stationary pin or shaft. Obviously, this construction leaves the stock of the worm relatively thin and subject to strain, distortion or buckling when heavy pressure is applied. Thus, the present worm departs from such a defect by being built in a single, massive piece and properly backed in the direction of strain. Consequently, since there is no strain upon the worm or the cup in a downward direction, it suffices that the cup 93 be driven into the headpiece as mentioned. Thus, in case of attention or repair, the removal of the center pin leaves the worm and cup free to be removed by tapping or driving from the top.

It will be evident from the above description that I have provided a center pin installation which is self-contained from the viewpoint of its immediate adjustment, forming a compact and sturdy unit. As mentioned, the adjustment of the center pin becomes an easy matter; and the balance of the tail stock is rendered more firm by the absence of a remote control for the adjustment of the center pin. Altogether, the novel center pin assembly is designed along lines of simplicity, efficiency and durability.

While I have described the improvement along specific lines, various minor changes and refinements may be made without departing from its principle, and I desire to consider all such changes and refinements as coming within the scope and spirit of the appended claims.

I claim:

1. In a tail stock for milling machines, a horizontal member longitudinally adjustable in the tail stock, a center pin carried by the forward end portion of said member, and means to dispose the center pin adjustably between high and low positions relative to said member, said means comprising a gear-toothed rear portion for the center pin, and a worm operatively disposed in said member and in mesh wtih said rear portion.

2. In a tail stock for milling machines, a horizontal member longitudinally adjustable in the tail stock, a center pin transversely journaled in the member to render its frontal portion adjustable between high and low positions, the rear portion of the center pin being gear-toothed, and a worm operatively disposed in said member and in mesh with said rear portion to render the center pin controllable by the worm.

3. In a tail stock for milling machines, a horizontal member longitudinally adjustable in the tail stock, a center pin transversely journaled in the member to render its frontal portion adjustable between high and low positions, the rear portion of the center pin being in the form of a sector gear, and a worm operatively disposed in said member and in mesh with said rear portion to render the center pin controllable by the worm.

4. The structure of claim 2, said member having a vertical bottom cavity receiving the worm, and a closure for said cavity serving as a support for the worm.

5. The structure of claim 2, said member having a bottom cavity, and a cup seating the worm and insertible into said cavity.

6. The structure of claim 2, said member having a bottom cavity, and a cup seating the worm and insertible into said cavity, said cup having a frontal opening for access by said rear portion too the worm.

7. The structure of claim 2, said member having a bottom cavity, and a cup seating the worm and insertible into said cavity, the floor of the cup being a part-spherical concavity, and the bottom of the worm being convexed to rotatably seat in such concavity.

8. The structure of claim 2, said member having a bottom cavity, a cup seating the worm and insertible into said cavity, and means to fix the cup against rotation relative to the member.

9. The structure of claim 2, said member having a bottom cavity, a cup seating the worm and insertible into said cavity, said cavity having a wall groove from its entrance, and a side key carried by the cup and lodged in the groove when the cup has been inserted in the cavity, whereby to lock the cup against rotation.

10. The structure of claim 2, the member having a thickened portion surmounting the worm, such thickened portion having an opening above the center portion of the worm, and a reduced portion of the worm rising freely through said opening.

11. The structure of claim 2, the member having a thickened portion surmounting the worm, such thickened portion having an opening above the center portion of the worm, and a reduced portion of the worm rising freely through said opening to a point substantially flush with the top of the member, and the top surface of said reduced portion being recessed to form a wrench socket.

ERICK MOEN.